Dec. 30, 1941.    E. D. TILLYER ET AL    2,267,961
MEANS OF TESTING LENSES
Filed Oct. 22, 1938    2 Sheets-Sheet 1
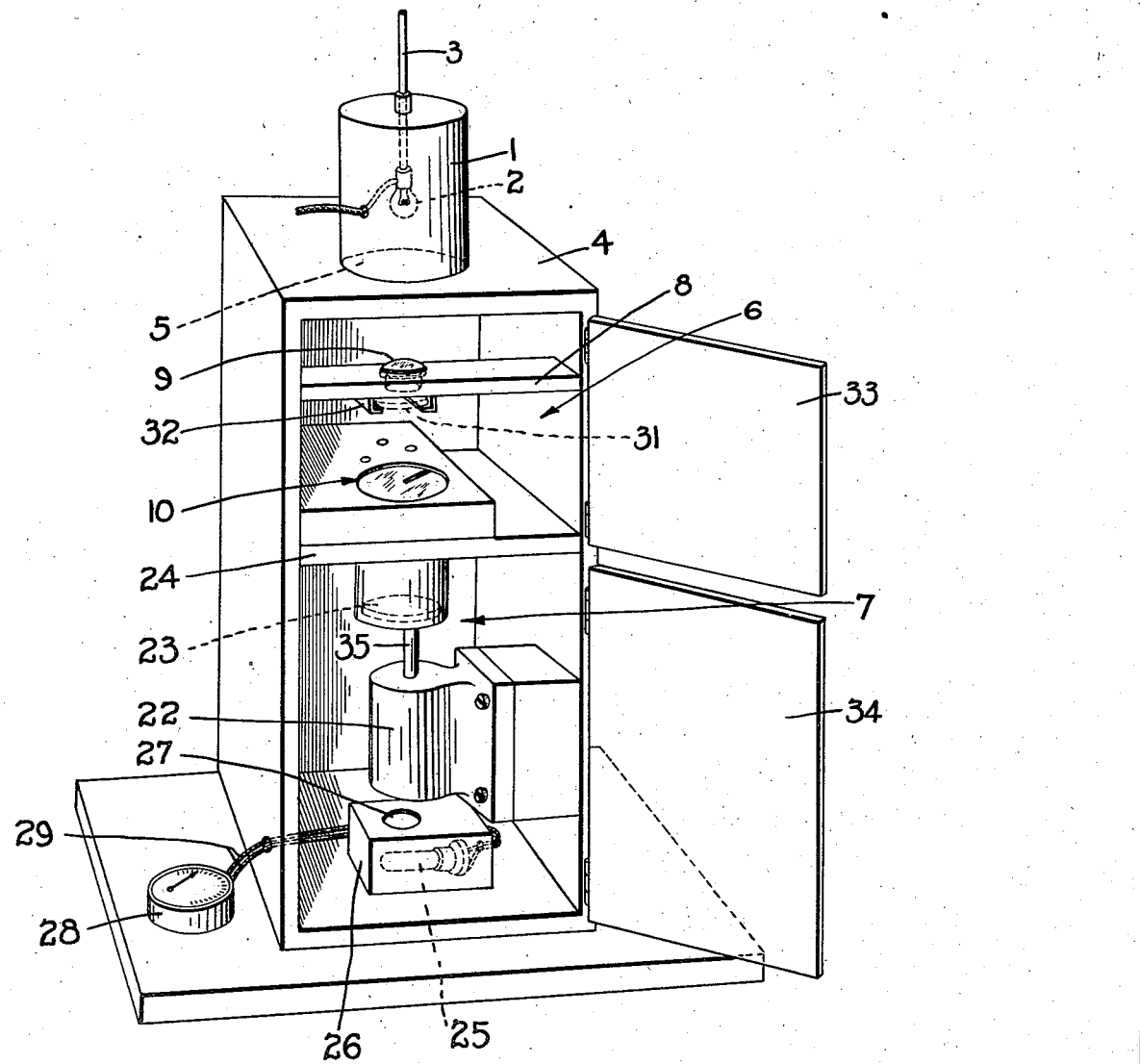
Fig. I
INVENTOR.
EDGAR D. TILLYER
CARL B. WHITE
BY
Harry H. Styll.
ATTORNEY.

Dec. 30, 1941.                E. D. TILLYER ET AL                    2,267,961
                              MEANS OF TESTING LENSES
                              Filed Oct. 22, 1938              2 Sheets-Sheet 2
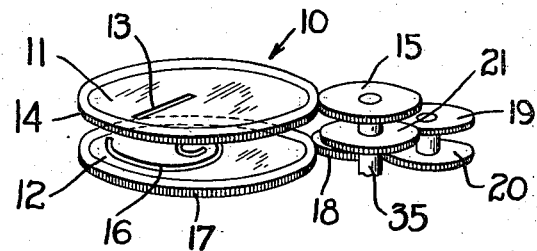
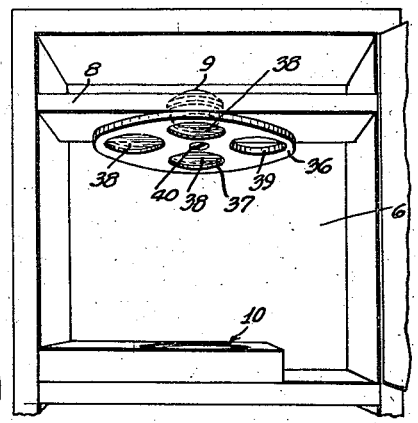
Fig. IV
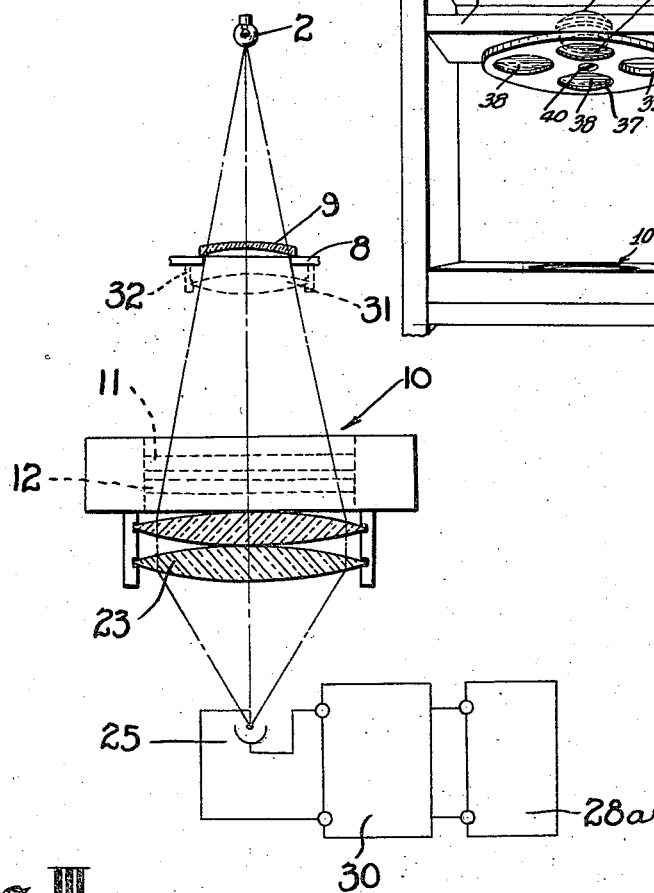
Fig. II
Fig. III
INVENTOR.
EDGAR D. TILLYER
CARL B. WHITE
BY
Harry H. Still
ATTORNEY.

Patented Dec. 30, 1941

2,267,961

UNITED STATES PATENT OFFICE 2,267,961

MEANS OF TESTING LENSES

Edgar D. Tillyer, Southbridge, and Carl B. White, Brimfield, Mass., assignors to American Optical Company, Southbridge, Mass., a voluntary association of Massachusetts Application October 22, 1938, Serial No. 236,478

3 Claims. (Cl. 88—14)

This invention relates to improvements in inspection devices and has particular reference to improved lens inspection means.

One of the principal objects of the invention is to provide improved lens inspection means whereby defective surface regularity or body defects, etc., may be positively detected and measured with the element of human judgment removed from such tests.

Another object of the invention is to provide novel means of lens inspection whereby the entire area of the lens is automatically scanned or analyzed for inspection purposes.

Another object is to provide novel means of lens inspection whereby the above defects in lenses may be quickly and accurately determined by the variation in light transmission, dispersion, and refraction introduced by the defective portions of the lens.

Other objects and advantages of the invention should become apparent from the following description taken in connection with the accompanying drawings and it will be apparent that many changes may be made in the details of construction and arrangement of parts shown and described without departing from the spirit of the invention as expressed in the accompanying claims.

We, therefore, do not wish to be limited to the exact details and arrangements shown and described as the preferred forms only have been given by way of illustration.

Referring to the drawings:

Fig. I is a perspective view of the device embodying the invention;

Fig. II is a fragmentary perspective view of the scanning means of the device illustrated in Fig. I;

Fig. III is a schematic view of said device; and

Fig. IV is a fragmentary front elevation partially in perspective of a modified construction of the device illustrated in Fig. I.

It has been found in the past that during the forming of ophthalmic lenses various defects may be introduced. These defects may come into existence during the initial shaping of the glass or during the various steps of the processes through which the glass is carried in completing the lenses. Some of these various defects are as follows: body defects such as striae, bubbles, seed, folds and the like, and surface irregularities and defects, such as grey or orange peel, pennies, scratches, pits, grinding marks and other grinding, polishing or blocking defects, etc.

The above defects are all commonly known in the ophthalmic art. It has been usual, in the past, to employ a number of individuals who are specially trained for inspecting lenses for said defects. Such inspections were subject to the accuracy of observation and judgment of the individual making the test. In other words, they had to rely upon the dependability and accuracy of observation of said individuals. It, therefore, is one of the primary objects of this invention to overcome the above difficulty by providing more positive and accurate means of testing lenses and for positively eliminating errors and inaccuracies inherent in visual inspection.

Referring more particularly to the drawings wherein like characters of reference designate like parts throughout the several views, the device comprises broadly, as illustrated in Fig. I, a housing 1 having a high intensity point source of illumination 2 therein. The source of illumination 2 is supported by suitable means, such as a rod 3, whereby it may be adjusted longitudinally of the housing 1. The walls of the interior of the housing 1 are preferably light-absorbing, such as matte black, to eliminate reflections and to make the source 2 approach a more physically perfect point source. The housing 1 is supported upon a chamber 4 and in alignment with an opening 5 in the top of said chamber. The said chamber 4 comprises two compartments 6 and 7. In the compartment 6 there is provided a suitable support 8 on which the lens or work 9 may be supported for inspection. The support 8 has a suitable opening therein over which the work or lens 9 is supported in alignment with the point source 2. The opening is of such a size that substantially the entire area of the lens 9 is free to transmit light from the light source 2.

Directly in line with the work or lens 9 there is supported scanning or analyzing means 10. This means may be one of many different arrangements, but, in this particular instance, comprises broadly a pair of discs 11 and 12, such as shown in Fig. II. The disc 11 is preferably opaque and has a slot 13 therein, extending radially from approximately the center of the disc to the edge of said disc. The disc 11 is supported in a suitable ring gear 14 having a connection with a power gear 15 which, in turn, is rotated by a suitable motor 22, see Fig. I, connected with the shaft 35 through a suitable standard reduction gearing or coupling, not shown.

The disc 12 is supported in direct axial alignment with the disc 11 and is also opaque and has a single turn spiral groove 16 therein. The disc 12, like the disc 11, is supported in a suitable ring gear 17 meshing with a gear 18 which is driven through a train of gears 19, 20 and 21 respectively.

The gearing is such as to drive the discs 11 and 12 in such a manner that the locus of the point opening determined by the intersection of the spiral 16 and slot 13 traces out a spiral path which completely covers the shadow image formed thereon by the interception of the light projected from the point source 2 by the lens or work 9. This is brought about by controlling the width of the slots 13 and 16 and the ratio of the various gears 15 and 17 to 21 inclusive. The gearing in the present case is such that the disc 11, having the slot 13 therein loses one revolution to every 50 revolutions of the disc 12 having the spiral slot 16 therein. That is, disc 11 rotates 49 times while disc 12 rotates 50 times. This rotation of the discs 11 and 12 will cause a 50 turn spiral to be traced out by the intersection of slot 13 and spiral slot 16, and will cover a circular area 100 mm. in diameter providing the width of the slot and spiral is at least 1 mm. and the length of the slot 13 is 50 mm. and the maximum radius of the spiral slot is 50 mm. It is apparent that these values and the ratio of the speed of disc 11 to that of disc 12 may be varied as desired, depending upon the size of the spot opening desired and the area to be covered.

The motor 22, which drives the train of gears set forth above is mounted within the compartment 7. In the said compartment 7 there is supported a suitable focusing lens system 23 in alignment with a suitable opening in the shelf 24 on which the scanning mechanism 10 is mounted. A light sensitive element 25, of any desirable commercial type, is positioned within a suitable opaque metallic housing 26 of heavy, soft iron or the like, also supported within the compartment 7. The metallic housing 26 has an opening 27 in substantial axial alignment with the focusing lens system 23. The housing 26 provides an opaque casing for shielding the light sensitive element 25 from extraneous light and from stray electrical and magnetic fields. The light sensitive element 25 is connected to a suitable indicator 28 by the connection wires 29.

It is to be understood that the apparatus described above is so constructed that the light source 2, work 9, checking mechanism 10, focusing means 23 and light sensitive element 25 are all supported in substantial axial alignment with each other.

The function of the device is substantially as follows:

The work or lens 9 to be inspected is placed on the support 8 in alignment with the opening therein as described above. The source of light 2 is then turned on forming a cone of light covering the entire area of the lens 9 and forming, through the interception of said light by said lens, a shadow image of the lens on the scanning mechanism 10. It is to be understood that shadow image, as referred to herein, is the light which is transmitted through the lens under test and it is this shadow which is scanned to detect defects in the lens producing said shadow. Power is then imparted to the motor 22, as by a suitable switch or other means not shown, to cause the scanning discs 11 and 12 to rotate. Rotation of the discs 11 and 12 causes movement of the slots 13 and 16 relative to each other and thereby causes the equivalent of a moving aperture to completely cover the area of the shadow image. This moving aperture is the aperture produced by rotation of the discs 11 and 12 and the slots 13 and 16 relative to each other and its function, in order to be more clearly understood, might be termed that of a single roving aperture. If the lens has no defects or only slight defects and the shadow is substantially constant as to brightness throughout, the light passing through and received by the light sensitive element 25 will be of substantially constant intensity for all positions of the aperture throughout the area scanned. If, however, there is an objectionable defect, such as one of those set forth above, the density of the shadow will be varied by said defect so that the part of the shadow corresponding to the area of said defect will be either darker or lighter than the remaining area of said shadow. When the scanning aperture passes over the variation of image brightness caused by the defect there will be a variation of the light intensity received by the light sensitive element 25, causing a variation in the current output of the light sensitive element proportional to the change of brightness in the defective area of the shadow image brought about by the defect. This change in current output may be recorded on an indicator or may actuate relay mechanism 28a. It is to be understood that suitable amplifying means 30 may be used in between the light sensitive element 25 and the indicator or relay means 28a. In the case of the relay mentioned, this would be used when same type of automatic means is provided for ejecting the defective lenses or work.

If the lenses under inspection are of a relatively high power, plus or minus, a suitable compensating or neutralizing lens 31 may be positioned in a holder 32 provided on the support 8 beneath the lens 9. If desirable a plurality of different power compensating or neutralizing lenses may be provided. Such lenses could be supported in a suitable adjustable holder whereby they could be separately moved into and out of operative position. This could be a rotatable disc having neutralizing lenses of graded powers and a blank opening therein. This is illustrated in Fig. IV which shows a disc 36 having openings 37 therein in which are positioned neutralizing lenses 38 of graded powers, and a blank opening 39. This disc is attached by a member 40 to the support 8 of Figure 1, so that the disc takes the place of the holder 32. The disc 36 is so positioned on the mounting 8 as to permit the alignment of each of the openings therein with the lens 9 upon rotation of the disk about the member 40 as a pivot.

The compartments 6 and 7 may be provided with suitable doors or the like, 33 and 34, for sealing the said compartments against the entrance of light, dirt, dust, etc.

It is to be understood that the light-sensitive cell circuit may be so controlled that it will indicate only major defects. The wording "major defects" designates defects which lie within the useful area of the lens and are of such characteristics as to be objectionable optically as well as physically. In other words, the objection as regards the defect is not only the size of the defect and its light transmission, dispersion and refraction properties, but also, its position on the lens. For example: If the defect is at the edge or out of the useful area of the lens, it can be disregarded, but if the defect is in the central useful area of the lens, it must be indicated, providing it is of a certain objectionable physical or optical magnitude.

From the foregoing description it will be seen that simple, efficient and economical means have been provided for accomplishing all of the objects and advantages of the invention, particularly of providing improved means whereby a shadowgraph type of image is produced of the lens under test and means is employed for automatically and positively inspecting the said shadowgraph and therefore the lens.

Having described our invention, we claim:

1. In a device of the character described the combination of a housing having means therein for supporting work to be inspected, means contained in a chamber of said housing for projecting light through said work to produce a shadow image thereof, light sensitive means supported in said housing and scanning means comprising two dissimilarly slotted disc members rotatably supported between said light projecting means and said light sensitive means, means for rotating said discs relative to each other at different speeds for producing a roving aperture which traverses a given area of the shadow of greater size than the aperture in a continuous line and so as to cover one small area of said shadow area at a time and means for projecting light traversing said roving aperture onto the light sensitive means.

2. In a device of the character described the combination of means for supporting work to be inspected, a light source for projecting light through said work to produce a shadow image thereof, light sensitive means adapted to receive said projected light, light intercepting means between said light sensitive means and said work arranged to be moved in such a manner as to produce an effect equivalent to that which would be produced by displacing a member having only a single aperture therein, means for moving said intercepting means so that the effective aperture moves in a continuous path substantially throughout the entire usable area of the work and so as to cover only one small area at a time of said usable area so as to produce characteristics which will vary the current output of the light sensitive means intercepting the light coming from said effective aperture according to any existing unevenness of intensity in the shadow brought about by defects in the work and means associated with said light sensitive means adapted to respond to the variations of current output brought about by defects of objectionable magnitude in the work.

3. In a device of the character described the combination of means, for supporting work to be inspected, a light source for projecting light through said work to produce a shadow image thereof, light sensitive means adapted to receive said projected light, light intercepting means between said light sensitive means and said work, said light intercepting means and said work being so arranged as to be moved relative to each other in such a manner as to produce an effect equivalent to that which would be produced by displacing a member having only a single aperture therein, means for moving said intercepting means and work relative to each other so that the effective aperture moves in a continuous path substantially throughout the entire usable area of the work and so as to cover only one small area at a time of said usable area so as to produce characteristics which will vary the current output of the light sensitive means intercepting the light coming from said effective aperture according to any existing unevenness of intensity in the shadow brought about by defects in the work and means associated with said light sensitive means adapted to respond to the variations of current output brought about by defects of objectionable magnitude in the work.

EDGAR D. TILLYER.
CARL B. WHITE.